United States Patent
Kim et al.

(10) Patent No.: US 9,552,113 B2
(45) Date of Patent: Jan. 24, 2017

(54) TOUCH SENSING DISPLAY DEVICE FOR SENSING DIFFERENT TOUCHES USING ONE DRIVING SIGNAL

(71) Applicant: Samsung Display Co., Ltd., Yongin, Gyeonggi-Do (KR)

(72) Inventors: In Cheol Kim, Goyang-si (KR); Seung Ho Nam, Seongnam-si (KR); Yoon Gyu Lee, Uijeongbu-si (KR); Won-Ki Hong, Suwon-si (KR); Seong Mo Hwang, Seongnam-si (KR)

(73) Assignee: SAMSUNG DISPLAY CO., LTD., Yongin (KR)

( * ) Notice: Subject to any disclaimer, the term of this patent is extended or adjusted under 35 U.S.C. 154(b) by 61 days.

(21) Appl. No.: 14/338,842

(22) Filed: Jul. 23, 2014

(65) Prior Publication Data
US 2015/0049049 A1    Feb. 19, 2015

(30) Foreign Application Priority Data
Aug. 14, 2013 (KR) .................. 10-2013-0096655

(51) Int. Cl.
*G06F 3/046* (2006.01)
*G06F 3/044* (2006.01)
*G06F 3/0354* (2013.01)

(52) U.S. Cl.
CPC ........... *G06F 3/044* (2013.01); *G06F 3/03545* (2013.01); *G06F 3/046* (2013.01); *G06F 2203/04106* (2013.01)

(58) Field of Classification Search
CPC ...................................................... G06F 3/046
See application file for complete search history.

(56) References Cited

U.S. PATENT DOCUMENTS

| | | | |
|---|---|---|---|
| 4,878,553 A | 11/1989 | Yamanami et al. | |
| 5,691,513 A | 11/1997 | Yamamoto et al. | |
| 5,792,997 A * | 8/1998 | Fukuzaki ............... | G06F 3/046 178/18.07 |
| 6,005,555 A | 12/1999 | Katsurahira et al. | |
| 6,690,156 B1 | 2/2004 | Weiner et al. | |
| 6,762,752 B2 | 7/2004 | Perski et al. | |
| 7,292,229 B2 | 11/2007 | Morag et al. | |
| 7,372,455 B2 | 5/2008 | Perski et al. | |
| 7,649,524 B2 | 1/2010 | Haim et al. | |

(Continued)

FOREIGN PATENT DOCUMENTS

| | | |
|---|---|---|
| JP | 2012-059073 A | 3/2012 |
| KR | 10-1124521 B1 | 2/2012 |

(Continued)

*Primary Examiner* — Sanghyuk Park
(74) *Attorney, Agent, or Firm* — Cantor Colburn LLP (57) ABSTRACT

A touch sensing display device includes: a display panel; a capacitive touch panel disposed on a front surface of the display panel; a digitizer disposed on a surface of the display panel; a sensor driving unit which sequentially applies scanning signals to the capacitive touch panel and the digitizer, where each of the scanning signal is applied simultaneously to the capacitive touch panel and the digitizer; and a sensing unit which senses sensing signals of the capacitive touch panel and the digitizer, in which the sensing unit receives the sensing signal of the capacitive touch panel and the sensing signal of the digitizer at different times.

14 Claims, 9 Drawing Sheets

(56) References Cited

U.S. PATENT DOCUMENTS

| | | | |
|---|---|---|---|
| 7,843,439 B2 | 11/2010 | Perski et al. | |
| 2005/0189154 A1 | 9/2005 | Perski et al. | |
| 2006/0012580 A1 | 1/2006 | Perski et al. | |
| 2006/0012581 A1* | 1/2006 | Haim | G06F 3/046 345/173 |
| 2007/0018076 A1* | 1/2007 | Chen | G06F 3/046 250/208.2 |
| 2007/0062852 A1 | 3/2007 | Zachut et al. | |
| 2007/0242056 A1 | 10/2007 | Engelhardt et al. | |
| 2007/0268272 A1 | 11/2007 | Perski et al. | |
| 2007/0285404 A1 | 12/2007 | Rimon et al. | |
| 2007/0292983 A1 | 12/2007 | Kriman et al. | |
| 2008/0012835 A1 | 1/2008 | Rimon et al. | |
| 2008/0012838 A1 | 1/2008 | Rimon | |
| 2008/0023232 A1 | 1/2008 | Morag et al. | |
| 2008/0046425 A1 | 2/2008 | Perski | |
| 2008/0128180 A1 | 6/2008 | Perski et al. | |
| 2008/0170046 A1 | 7/2008 | Rimon et al. | |
| 2008/0218487 A1* | 9/2008 | Huang | G06F 3/044 345/173 |
| 2008/0218494 A1 | 9/2008 | Perski et al. | |
| 2008/0238881 A1 | 10/2008 | Perski et al. | |
| 2008/0238885 A1 | 10/2008 | Zachut et al. | |
| 2009/0025987 A1 | 1/2009 | Perski et al. | |
| 2009/0027354 A1 | 1/2009 | Perski et al. | |
| 2009/0078476 A1 | 3/2009 | Rimon et al. | |
| 2009/0095540 A1 | 4/2009 | Zachut et al. | |
| 2009/0107736 A1 | 4/2009 | Ben-Eliyahu et al. | |
| 2009/0127005 A1 | 5/2009 | Zachut et al. | |
| 2009/0128516 A1 | 5/2009 | Rimon et al. | |
| 2009/0146654 A1* | 6/2009 | Ogawa | G01B 7/003 324/228 |
| 2009/0184939 A1 | 7/2009 | Wohlstadter et al. | |
| 2009/0273579 A1 | 11/2009 | Zachut et al. | |
| 2009/0322352 A1 | 12/2009 | Zachut et al. | |
| 2009/0322696 A1 | 12/2009 | Yaakoby et al. | |
| 2010/0051356 A1 | 3/2010 | Stern et al. | |
| 2010/0155153 A1 | 6/2010 | Zachut | |
| 2011/0069022 A1* | 3/2011 | Yokota | G06F 3/0416 345/173 |
| 2011/0153263 A1* | 6/2011 | Oda | G06F 3/03545 702/150 |
| 2011/0216032 A1* | 9/2011 | Oda | G06F 3/044 345/174 |
| 2011/0241651 A1 | 10/2011 | Oda | |
| 2012/0013555 A1 | 1/2012 | Maeda et al. | |
| 2013/0093725 A1 | 4/2013 | Reynolds | |
| 2013/0113707 A1 | 5/2013 | Perski et al. | |
| 2013/0194224 A1* | 8/2013 | Lai | G06F 3/0412 345/174 |
| 2014/0002413 A1* | 1/2014 | Kim | G06F 3/0416 345/174 |

FOREIGN PATENT DOCUMENTS

| | | |
|---|---|---|
| KR | 10-2012-0079595 A | 7/2012 |
| KR | 1020140142380 | 12/2014 |
| WO | 2011-058562 A1 | 5/2011 |
| WO | 2012-014206 A2 | 2/2012 |

* cited by examiner

TOUCH SENSING DISPLAY DEVICE FOR SENSING DIFFERENT TOUCHES USING ONE DRIVING SIGNAL

This application claims priority to Korean Patent Application No. 10-2013-0096655, filed on Aug. 14, 2013, and all the benefits accruing therefrom under 35 U.S.C. §119, the contents of which are incorporated by reference herein in its entirety.

BACKGROUND (a) Field

Exemplary embodiments of the invention relate to a touch sensing display device, and more particularly, to a touch sensing display device which may sense touches by a finger and a pen.

(b) Description of the Related Art

Recently, a flat panel display having a touch sensor embedded therein has been developed. The touch sensor senses a change in pressure or intensity of light, which occurs due to a touch by a user's finger, a touch pen, a stylus or the like, and provides an electrical signal corresponding to the sensed change to a display device. The display device having the touch sensor generally determines whether a touch occurs and a position of the touch based on the electrical signal, and transmits information on the touch to an external device which transmits an image signal based on the touched information to the display device.

Generally, the display device which senses a touch by the finger does not recognize a touch by the pen, and the display device which senses the touch by the pen does not recognize the touch by the finger.

Recently, the display device which senses all of the touches by the finger and the pen is being developed, and such a display device typically includes two separate sensing devices, e.g., a touch panel which senses a finger and a digitizer which senses the pen.

SUMMARY

Exemplary embodiments of the invention provide a touch sensing display device that senses touches by a finger and a pen by applying one driving signal to each pixel.

An exemplary embodiment of the invention provides a touch sensing display device including: a display panel; a capacitive touch panel disposed on a front surface of the display panel; a digitizer disposed on a surface of the display panel; a sensor driving unit which sequentially applies scanning signals to the capacitive touch panel and the digitizer, where each of the scanning signal is applied simultaneously to the capacitive touch panel and the digitizer; and a sensing unit which senses a sensing signal of the capacitive touch panel and a sensing signal of the digitizer, in which the sensing unit receives the sensing signal of the capacitive touch panel and the sensing signal of the digitizer at different times.

In an exemplary embodiment, each of the scanning signals may be applied during a scanning signal application period, and a blank period may be between two consecutive scanning signal application periods.

In an exemplary embodiment, the sensing signal of the capacitive touch panel may be transferred to the sensing unit during the scanning signal application period and the sensing signal of the digitizer may be transferred to the sensing unit during the blanking period.

In an exemplary embodiment, the number of sensing unit may be one.

In an exemplary embodiment, the touch sensing display device may further include: a scanning signal line which extends substantially in a predetermined direction and transmits the scanning signals; and a sensing signal line which extends substantially in a direction substantially vertical to the scanning signal line and transmits the sensing signal of the capacitive touch panel or the sensing signal of the digitizer.

In an exemplary embodiment, the sensing unit may include a first sensing unit part and a second sensing unit part, the sensing signal of the capacitive touch panel may be transferred to the first sensing unit part, and the sensing signal of the digitizer may be transferred to the second sensing unit part.

In an exemplary embodiment, the touch sensing display device may further include: a scanning signal line which extends substantially in a predetermined direction and transmits the scanning signals; a sensing signal line which extends substantially in a direction vertical to the scanning signal line, in which the first sensing unit may be connected to the sensing signal line and the second sensing unit may be connected to the scanning signal line.

In an exemplary embodiment, the touch sensing display device may further include a switch unit which controls a connection between the second sensing unit and the scanning signal line and a connection between the sensor driving unit and the scanning signal line.

In an exemplary embodiment, the touch sensing display device may further include: a pen which electromagnetically resonates with the scanning signals to enable the digitizer to sense a position of the pen.

In an exemplary embodiment, the pen may include a resonance circuit unit to allow the sensing signal of the digitizer to be generated during the blanking period.

In an exemplary embodiment, the touch sensing display device may further include: a window which is disposed on a front surface of the capacitive touch panel.

In an exemplary embodiment, the touch sensing display device may further include an integrated sensing panel in which the capacitive touch panel and the digitizer are integrally disposed.

In an exemplary embodiment, the integrated sensing panel may include a scanning signal line which is disposed substantially in a horizontal direction and has quadrangular loop structures, a side of which is opened, and a sensing signal line which extends substantially in a vertical direction and includes sensing signal electrodes having bent structures, where each bent structure is disposed at a left side and a lower side of a corresponding quadrangular loop structure of the quadrangular loop structures.

In an exemplary embodiment, the quadrangular loop structures of the scanning signal line may be arranged substantially in the horizontal direction and electrically connected to each other, and the bent structures of the sensing signal electrodes may be arranged substantially in the vertical direction and electrically connected to each other.

In an exemplary embodiment, a capacitive touch may be sensed at a portion at which the scanning signal line and the sensing signal line overlap each other.

In an exemplary embodiment, each of the scanning signals is applied during a scanning signal application period, and a blanking period may be between two consecutive scanning signal application periods.

In an exemplary embodiment, the sensing signal of the capacitive touch panel may be transferred to the sensing unit during the scanning signal application period, and the sensing signal of the digitizer may be transferred to the sensing unit during the blanking period.

In an exemplary embodiment, the sensing unit may include a first sensing unit part and a second sensing unit part, the sensing signal of the capacitive touch panel may be transferred to the first sensing unit part, and the sensing signal of the digitizer may be transferred to the second sensing unit part.

In an exemplary embodiment, the first sensing unit part may be connected to the sensing signal line, and the second sensing unit part may be connected to the scanning signal line.

In an exemplary embodiment, the touch sensing display device may further include a switch unit which controls a connection between the second sensing unit and the scanning signal line and a connection between the sensor driving unit and the scanning signal line.

In exemplary embodiments as set forth herein, the touch of the finger and the pen may be sensed at different times using a single driving unit to sense the touch of the finger and the pen. In such embodiments, the thickness of the display device may be reduced and the manufacturing cost of the touch sensing display device may be reduced by performing the touch of the finger and the pen through the single touch panel.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of a touch sensing display device according to the invention will be described in detail with reference to FIG. 1.

Figure 1:
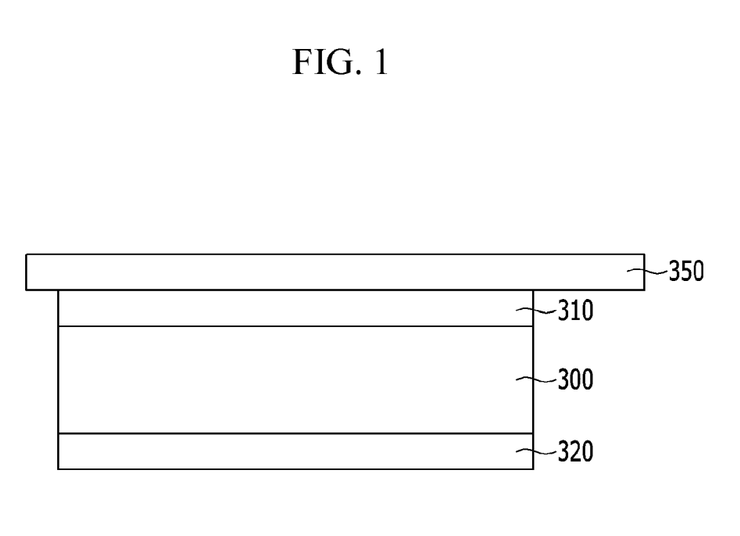
FIG. 1 is a cross-sectional view of an exemplary embodiment of a touch sensing display device, according to the invention.

FIG. 1 is a cross-sectional view of an exemplary embodiment of a touch sensing display device, according to the invention.

An exemplary embodiment of the touch sensing display device includes display panel 300, digitizer 320 which senses a pen and is disposed on a rear surface of the display panel 300, and a capacitive touch panel 310 which senses a finger and is disposed on a front surface of the display panel 300. In an exemplary embodiment, the touch sensing display device may further include a window 350 disposed on a front surface of the capacitive touch panel 310 to protect the capacitive touch panel 310.

In an exemplary embodiment, the display panel 300 may be one of various types of display panel. In one exemplary embodiment, for example, the display panel 300 may be a liquid crystal panel, an organic light emitting display panel, an electrophoretic display panel or an electrowetting display panel.

In an exemplary embodiment, where the display panel 300 is a non-emissive display panel, such as the liquid crystal panel, the display panel 300 may further include a backlight unit.

In an exemplary embodiment, the display panel 300 includes a gate line to which a gate voltage is applied, a data line to which a data voltage is applied, and a pixel which is connected to the gate line and the data line. In such an embodiment, the display panel 300 may further include a gate driving unit which applies the gate voltage to the gate line, a data driving unit which applies the data voltage to the data line, and a signal control unit which controls the gate driving unit and the data driving unit.

In such an embodiment, an image signal is transferred to the signal control unit, and the signal control unit controls the data driving unit and the gate driving unit to allow the display panel 300 to display an image corresponding to the image signal.

The display panel 300 includes a plurality of pixels, which may have various structures.

In an exemplary embodiment, as shown in FIG. 1, the touch sensing display device may include the capacitive touch panel 310 and the digitizer 320, respectively.

In such an embodiment, the capacitive touch panel 310 is disposed on the display panel 300 to sense a touch of a conductive object, such as a finger of a user. The capacitive touch panel 310 senses a touch by a method including sensing a changing value of capacitance, which is generated by the overlapping of two different electrodes, due to the touch of the conductive object The digitizer 320 is disposed under the display panel 300 and senses a touch by a method including sensing a position of the pen by an electromagnetic resonance ("EMR"). According to an alternative exemplary embodiment of the invention, the digitizer may be disposed on a front surface of the display panel 300 and may be disposed between the display panel 300 and the capacitive touch panel 310.

The capacitive touch panel 310 and the digitizer 320 include a sensor driving unit which transmits a driving signal to a sensor thereof and a sensing unit which receives a sensing signal generated based on the driving signal. According to an exemplary embodiment of the invention, a single sensor driving unit may be provided in the capacitive touch panel 310 and the digitizer 320, and thus the capacitive touch panel 310 and the digitizer 320 are simultaneously applied with the same signal. In an alternative exemplary embodiment of the invention two sensor driving units may be provided to the capacitive touch panel 310 and the digitizer 320, respectively, and the two sensor driving units may be synchronized to each other and collectively generates driving signals, which are substantially the same as the driving signals from the single sensor driving unit. According to an exemplary embodiment of the invention, a single sensing unit may be provided to the capacitive touch panel 310 and the digitizer 320 include. In an alternative exemplary embodiment, the capacitive touch panel 310 and the digitizer 320 may be provided with two separate sensing units, respectively.

According to an exemplary embodiment of the invention, the capacitive touch panel 310 and the digitizer 320 may be disposed in a same panel, which will be described later in detail with reference to FIG. 6.

The front surface of the touch sensing display device is provided with the window 350 which protects the touch sensing display device. The window 350 may include a transparent material, such as glass or plastic, for example, and protects a structure of the touch sensing display device disposed therebelow. The window 350 may define the front surface of an electronic device including the touch sensing display device, for example, a mobile phone or a tablet computer. In such an embodiment, as shown in FIG. 1, the window 350 may have a size greater than the display panel 300, the capacitive touch panel 310 and the digitizer 320.

Hereinafter, an exemplary embodiment of a method of driving and sensing the capacitive touch panel 310 and the digitizer 320 using a single sensor driving unit 400 will be described with reference to FIG. 2.

Figure 2:
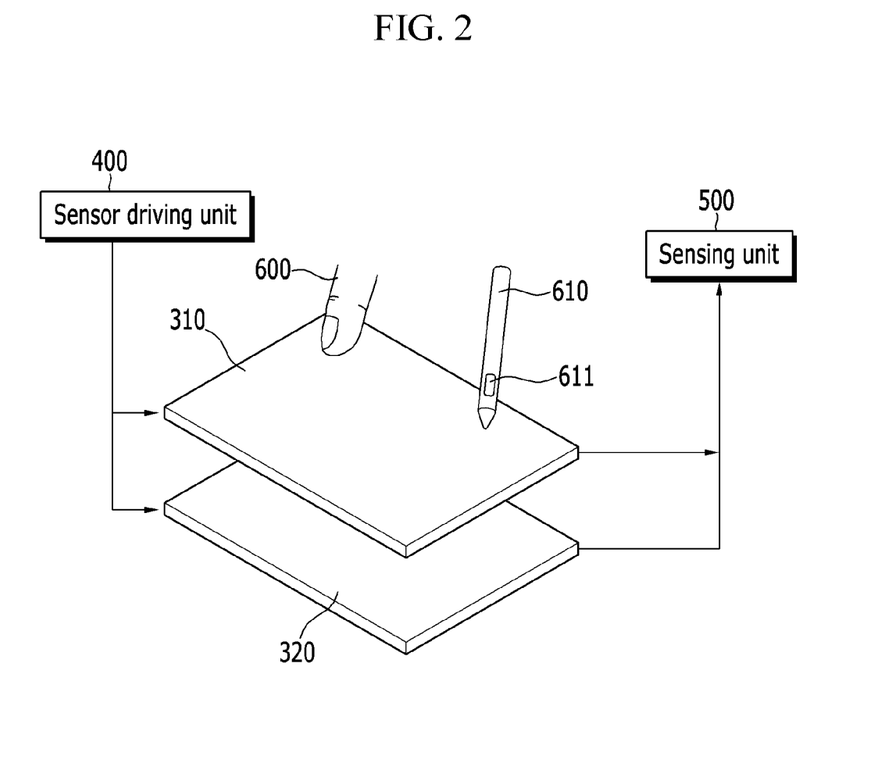
FIG. 2 is a diagram illustrating a sensing operation of an exemplary embodiment of the touch sensing display device, according to the invention.

FIG. 2 is a diagram illustrating a sensing operation of an exemplary embodiment of the touch sensing display device, according to the invention.

In an exemplary embodiment, as shown in FIG. 2, the touching sensing display device includes a sensor driving unit 400 which drives the capacitive touch panel 310 and the digitizer 320, and a sensing unit 500 which senses a touch on the capacitive touch panel 310 and the digitizer 320. In FIG. 2, the display panel 300 and the window 350 of the touch sensing display are omitted for convenience of illustration.

In FIG. 2, the conductive object, e.g., a finger 600, and a pen 610, such as an input stylus, are also illustrated on the touch sensing display device. In such an embodiment, the pen 610 may include a resonance circuit unit 611.

The capacitive touch panel 310 and the digitizer 320 include scanning signal lines which are arranged substantially in a predetermined direction, and sensing signal lines which are arranged in a direction substantially vertical to the predetermined direction.

In an exemplary embodiment, as illustrated in FIG. 2, when one or both of the finger 600 and the pen 610 touch the touch sensing display device, the touch is sensed by the following operation.

The touch sensing display device includes the sensor driving unit 400 for driving the capacitive touch panel 310 and the digitizer 320. The sensor driving unit 400 sequentially applies the scanning signals to the scanning signal lines of the capacitive touch panel 310 and the digitizer 320. In such an embodiment, a same scanning signal is applied to a first scanning signal line of the capacitive touch panel 310 and a first scanning signal line of the digitizer 320 at the same timing. Next, a same scanning signal is applied to a second scanning signal line of the capacitive touch panel 310 and a second scanning signal line of the digitizer 320 at the same timing. As such, a same scanning signal is sequentially applied to the first to final scanning signal lines of the capacitive touch panel 310 and the digitizer 320 at the same timing.

As such, when the driving signal is simultaneously applied to the capacitive touch panel 310 and the digitizer 320, the capacitive touch panel 310 outputs a signal that indicates whether capacitance is changed by the finger 600 to the sensing unit 500 through a corresponding sensing signal line, and the digitizer 320 outputs a signal that indicates whether an electromagnetic field is changed by the pen 610 to the sensing unit 500 through a corresponding sensing signal line.

The sensing unit 500 receives the sensing signals which are output from the capacitive touch panel 310 and the digitizer 320. In such an embodiment, the sensing signals applied to the sensing unit 500 from the capacitive touch panel 310 and the digitizer 320 are applied at different timings to allow the sensing unit 500 to perform the sensing of the finger 600 and the pen 610.

Hereinafter, a waveform of the sensing signals of the capacitive touch panel 310 and the digitizer 320 based on the application of the driving signal, e.g., the sensing signal, will be described with reference to FIG. 3.

Figure 3:
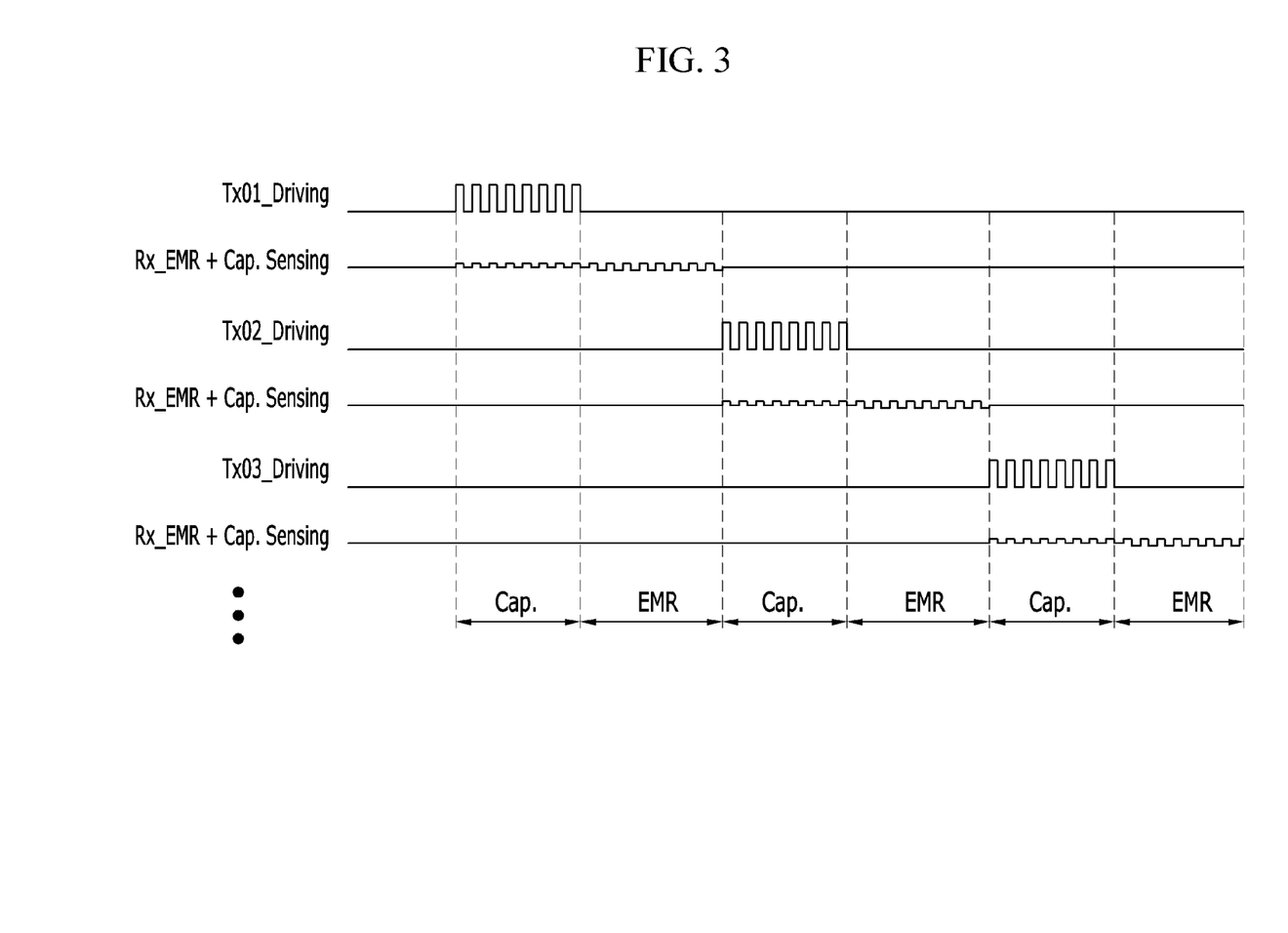
FIG. 3 is a waveform diagram illustrating scanning and sensing signals of the touch sensing display device of FIG. 2.

FIG. 3 is a waveform diagram illustrating the scanning and sensing signals of the touch sensing display device of FIG. 2.

In FIG. 3, 'Tx' represents the scanning signal output from the sensor driving unit 400, and the numbers attached behind 'Tx', e.g., 01, 02 and 03, are channel number. The channel number may correspond to one scanning signal line or a plurality of scanning signal lines. Hereinafter, one exemplary embodiment of the invention, in which one scanning signal line corresponds to one channel, will be described for convenience of description. Further, 'Rx' represents the sensing signal which is received by the sensing unit 500.

In an exemplary embodiment, as illustrated in FIG. 3, the sensor driving unit 400 sequentially applies square wave pulse signals to the scanning signal lines of the capacitive touch panel 310 and the digitizer 320 for predetermined time periods corresponding thereto. In such an embodiment, a blank period of a predetermined time period is between predetermined time periods of the square wave pulse signals applied to two adjacent scanning signal lines of the capacitive touch panel 310 and the digitizer 320.

In such an embodiment, a same scanning signal, e.g., a same square wave pulse signal, is applied to the first scanning signal line of the capacitive touch panel 310 and the first scanning signal line of the digitizer 320 at the same timing. When the application of the scanning signal to the first scanning signal line ends, the blank period is present for a predetermined time from the ending time of the application of the scanning signal to the first scanning signal line, and then the same scanning signal is applied to the second scanning signal line of the capacitive touch panel 310 and the second scanning signal line of the digitizer 320 at the same timing. As such, the same scanning signal is sequentially applied to the first to final scanning signal lines of the capacitive touch panel 310 and the digitizer 320 at the same timing.

Hereinafter, a period during which the scanning signals, which are the square wave pulse signals, are applied, is referred to as a scanning signal application period (Cap. in FIG. 3), and a period between the scanning signals applied to two adjacent scanning signal lines, that is, the scanning signal application period of two consecutive scanning signals is referred to as a blank period (EMR in FIG. 3).

In an exemplary embodiment, as described above and shown in FIG. 3, the capacitive touch panel 310 and the digitizer 320, which are each applied with the scanning signals and output the sensing signals, and the periods, during which the sensing signals are applied from the capacitive touch panel 310 and the digitizer 320, are separated from each other without temporally overlapping each other.

First, an operation of the capacitive touch panel 310 will be described in detail.

When the scanning signals, which are the square wave pulse signals of the sensor driving unit 400, are sequentially applied to the scanning signal lines of the capacitive touch panel 310, the sensing signals are sequentially output from the sensing signal lines at the same timing. In such an embodiment, the sensing signal is transferred through the portion at which the scanning signal lines and the sensing signal lines are capacitively coupled to each other, such that a size of the square wave pulse of the sensing signal is smaller than a size of the square wave pulse of the scanning signal.

In one exemplary embodiment, for example, when the scanning signal, which is the square wave pulse signal, is applied to the first scanning signal line of the capacitive touch panel 310, the sensing signals are output to the plurality of sensing signal lines at the same timing. When the touch by the finger 600 does not occur on the capacitive touch panel 310, as illustrated in FIG. 3, the square wave pulse having a small size is generated, and when the touch by the finger 600 occurs on the capacitive touch panel 310, the square wave pulse may be deformed such that the touch by the finger 600 is detected.

Next, when the application of the scanning signal to the first scanning signal line ends, the scanning signal is in a blank period EMR for a predetermined time therefrom, and then when the scanning signal is applied to the second scanning signal line of the capacitive touch panel 310, the sensing signals are output to the plurality of sensing signal lines at the same timing. When the application of the scanning signal to the second scanning signal line ends, the scanning signal is in the blank period EMR for a predetermined time from the ending time, and then the scanning signal is also applied to a next scanning signal line. The same scanning signal is applied to the first to final scanning signal lines of the capacitive touch panel 310 as described above, such that the touch of the finger 600 on the capacitive touch panel 310 is sensed.

Hereinafter, an operation of the digitizer 320 will be described in detail.

When the scanning signals, which are the square wave pulse signals of the sensor driving unit 400, are sequentially applied to the scanning signal lines of the digitizer 320, the sensing signal is output during the blank period EMR in which the square wave pulse signals are not applied to the sensing signal lines. The square wave pulse signals applied to the scanning signal lines of the digitizer 320 generate an electromagnetic field, and when the pen 610 approaches the panel, the electromagnetic field is received by the resonance circuit unit 611 of the pen 610, and then is discharged to the digitizer 320 after a predetermined time lapses. In such an embodiment, the circuit in the resonance circuit unit 611 may have a structure in which the received electromagnetic field is held for a predetermined time, and then is resonated and discharged. The holding time may be controlled by controlling an inductance and capacitance ("LC") value of the circuit. In an exemplary embodiment of the invention, the electromagnetic field resonated by the resonance circuit unit 611 is discharged in the blank period EMR.

In one embodiment, for example, after the scanning signals, which are the square wave pulse signals, are applied to the first scanning signal lines of the digitizer 320, the sensing signals are output to the sensing signal lines at a starting point of the blank period EMR thereafter. When the touch by the pen 610 occurs on the digitizer 320, the sensing signal may be sensed by the resonated electromagnetic field.

When the blank period EMR ends, the scanning signals are applied to the second scanning signal lines of the digitizer 320, the sensing signals are output to the sensing signal lines at a starting point of the blank period thereafter. The same scanning signal is applied to the first to final scanning signal lines of the digitizer 320 as described above, such that the touch of the pen 610 on the digitizer 320 is sensed.

In an exemplary embodiment of the touch sensing display device, a single sensing unit 500 may be included, and the sensing of the finger 600 is performed in the scanning signal application period Cap., and the sensing of the pen 610 is performed in the blank period EMR, such that the sensing of the finger 600 and the sensing of the pen 610 may be separately performed using the single sensing unit 500.

Hereinafter, an alternative exemplary embodiment of the invention, the sensing unit 500 includes two sensing unit parts 510 and 520, will be described with reference to FIGS. 4 and 5.

Figure 4:
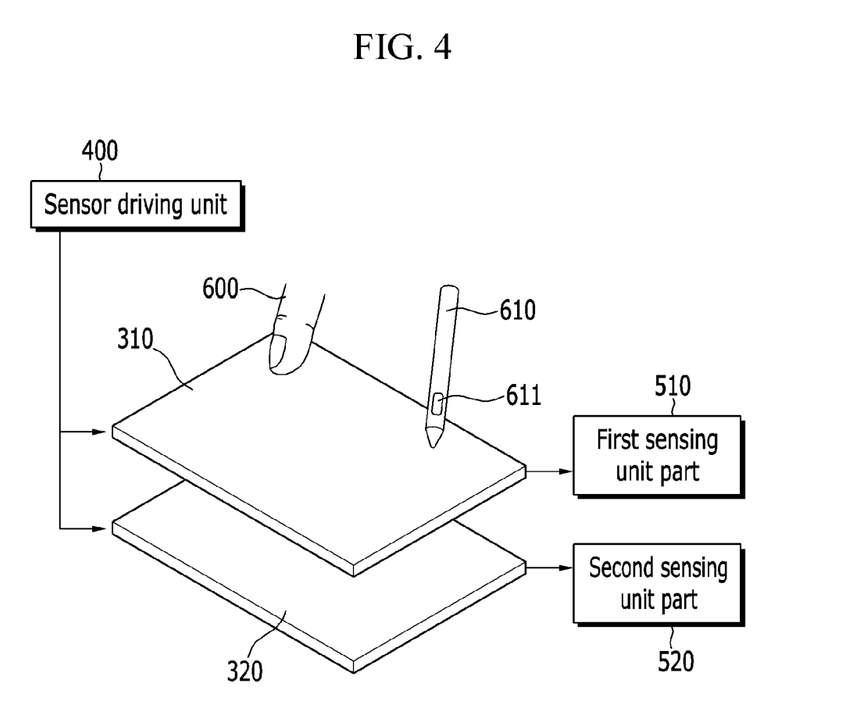
FIG. 4 is a diagram illustrating a sensing operation of an alternative exemplary embodiment of the touch sensing display device, according to the invention.
Figure 5:
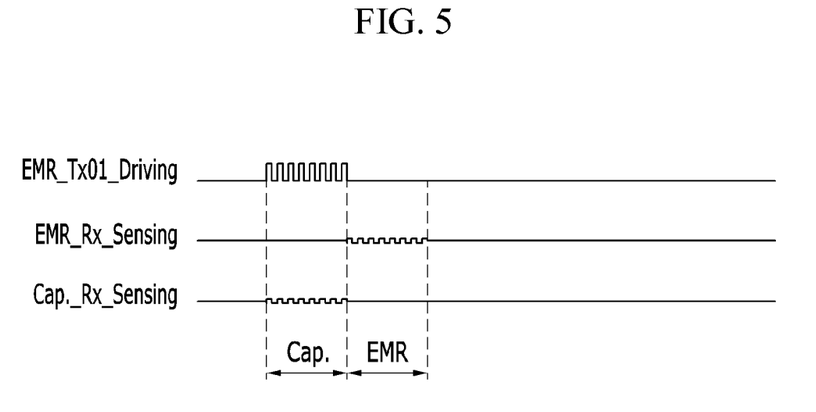
FIG. 5 is a waveform diagram illustrating scanning and sensing signals of the touch sensing display device of FIG. 4.

FIG. 4 is a diagram illustrating the sensing operation of an alternative exemplary embodiment of the touch sensing display device, according to the invention and FIG. 5 is a waveform diagram illustrating scanning and sensing signals of the touch sensing display device of FIG. 4.

In an exemplary embodiment, as shown in FIG. 4, the touch sensing display device includes the sensor driving unit 400 which drives the capacitive touch panel 310 and the digitizer 320, and the two sensing unit parts, e.g., first and second sensing unit parts 510 and 520, which sense the capacitive touch panel 310 and the digitizer 320, respectively. FIG. 4 illustrates only the touch sensing display device, and the display panel 300 and the window 350 are omitted for convenience of illustration.

In such an embodiment, the conductive object, e.g., a finger 600, and a pen 610, such as an input stylus, are also illustrated on the touch sensing display device of FIG. 4. In such an embodiment, the pen 610 includes a resonance circuit unit 611.

The capacitive touch panel 310 and the digitizer 320 include scanning signal lines, which are arranged substantially in a predetermined direction, and sensing signal lines, which are arranged substantially in a direction vertical to the predetermined direction.

In an exemplary embodiment, as illustrated in FIG. 4, when the finger 600 and the pen 610 touch the touch sensing display device together or separately, the touch is sensed by the following operation.

In such an embodiment, the touch sensing display device includes a sensor driving unit 400 for driving the capacitive touch panel 310 and a digitizer 320. The sensor driving unit 400 sequentially applies the scanning signals to the scanning signal lines of the capacitive touch panel 310 and the digitizer 320. In such an embodiment, the first scanning signal line of the capacitive touch panel 310 and the first scanning signal line of the digitizer 320 are applied with the same scanning signal at the same timing. Next, the second scanning signal line of the capacitive touch panel 310 and the second scanning signal line of the digitizer 320 are applied with the same scanning signal at the same timing. As such, the same scanning signal is sequentially applied to the first to final scanning signal lines of the capacitive touch panel 310 and the digitizer 320 at the same timing.

In such an embodiment, when the driving signal is simultaneously applied to the capacitive touch panel 310 and the digitizer 320, the capacitive touch panel 310 outputs a signal that indicates whether capacitance is changed by the finger 600 to the first sensing unit part 510 through the sensing signal line, and the digitizer 320 outputs a signal that indicates whether an electromagnetic field is changed by the pen 610 to the second sensing unit part 520 through the sensing signal line.

According to an exemplary embodiment of the invention, where the touch sensing display device includes the two sensing unit parts 510 and 520, the sensing signal transferred to the second sensing unit part 520 of the digitizer 320 may be partially in the scanning signal application period Cap., rather than in the blank period EMR.

In such an embodiment, the two sensing unit parts 510 and 520 each receive the sensing signals, which are output from the capacitive touch panel 310 and the digitizer 320. In an alternative exemplary embodiment, as described above, the sensing signals applied to the sensing unit parts 510 and 520 are applied at different timings between the capacitive touch panel 310 and the digitizer 320 to allow the sensing unit 500 to perform all of the touch sensing of the finger 600 and the pen 610. In such an embodiment, the sensing signal of the digitizer 320 may be sensed in the blank period EMR, and the sensing signal of the capacitive touch panel 310 is sensed in the scanning signal application period Cap.

Hereinafter, a waveform of the sensing signals of the capacitive touch panel 310 and the digitizer 320 based on the application of the driving signal will be described with reference to FIG. 5.

In FIG. 5, 'Tx' represents the scanning signal output from the sensor driving unit 400, and the number attached behind 'Tx', e.g., 01, represent a channel number. The channel number may correspond to one scanning signal line or a plurality of scanning signal lines. Hereinafter, an exemplary embodiment of the invention, in which one scanning signal line corresponds to one channel, will be described in detail. Further, 'Rx' represents the sensing signal received by the two sensing unit parts 510 and 520, 'EMR_Rx' represents the sensing signal of the second sensing unit part 520, which senses the sensing signal of the digitizer 320, and 'Cap._Rx' represents the sensing signal of the first sensing unit part 510, which senses the sensing signal of the capacitive touch panel 310.

In an exemplary embodiment, as illustrated in FIG. 5, the sensor driving unit 400 may sequentially apply square wave pulse signals to the scanning signal lines of the capacitive touch panel 310 and the digitizer 320 for predetermined time periods. In such an embodiment, the square wave pulse signal is applied between the adjacent scanning signal lines of the capacitive touch panel 310 and the digitizer 320, and a blank period of a predetermined time is between the predetermined time periods, during which the square wave pulse signals are sequentially applied.

In an exemplary embodiment, the first scanning signal line of the capacitive touch panel 310 and the first scanning signal line of the digitizer 320 are applied with the scanning signal, which is the same square wave pulse signal, at the same timing. When the application of the scanning signal to the first scanning signal line ends, the blank period of the predetermined time begins thereafter, and then the second scanning signal line of the capacitive touch panel 310 and the second scanning signal line of the digitizer 320 are applied with the same scanning signal at the same timing. As such, the same scanning signal is applied to the first to final scanning signal lines of the capacitive touch panel 310 and the digitizer 320 at the same timing.

Hereinafter, a period in which the scanning signals, e.g., the square wave pulse signals, are applied, is referred to as a scanning signal application period (Cap. in FIG. 5), and a period between the scanning signal application periods of two consecutive scanning signals is referred to as a blank period (EMR in FIG. 5).

As described above, the capacitive touch panel 310 and the digitizer 320, which are each applied with the scanning signals, output the sensing signals, and the periods in which the sensing signals are applied are separated from each other without temporally overlapping each other, as illustrated in FIG. 5.

First, an operation of the capacitive touch panel 310 will be described in detail.

When the scanning signals, which are the square wave pulse signal of the sensor driving unit 400, are sequentially applied to the scanning signal lines of the capacitive touch panel 310, the sensing signals are output from the sensing signal lines at the same timing. In such an embodiment, the sensing signal is transferred through the portion at which the scanning signal lines and the sensing signal lines are capacitively coupled with each other, such that a size of the square wave pulse of the sensing signal is smaller than a size of the square wave pulse of the scanning signal.

In such an embodiment, when the scanning signal, which is the square wave pulse signal, is applied to the first scanning signal line of the capacitive touch panel 310, the sensing signals are output to the plurality of sensing signal lines at the same timing. When a touch of the finger 600 does not occur on the capacitive touch panel 310, the square wave pulse having a small size is generated as illustrated in FIG. 5, and when the touch of the finger 600 occurs, the square wave pulse illustrated in FIG. 5 may be deformed.

Next, when the application of the scanning signal to the first scanning signal line ends, a blank period EMR of a predetermined time begins thereafter, and then when the scanning signal is applied to the second scanning signal line of the capacitive touch panel 310, the sensing signals are output to the plurality of sensing signal lines at the same timing. Next, when the application of the scanning signal to the second scanning signal line ends, the blank period EMR of a predetermined time begins thereafter, and then the scanning signal is applied to the next scanning signal line. As described above, the same scanning signal is applied to each of the first to final scanning signal lines of the capacitive touch panel 310, such that the touch of the finger 600 is sensed.

Hereinafter, an operation of the digitizer 320 will be described in detail.

When the scanning signals, which are the square wave pulse signals of the sensor driving unit 400, are sequentially applied to the scanning signal lines of the digitizer 320, the sensing signal is output during the blank period EMR, in which the square wave pulse signals are not applied to the sensing signal lines. The square wave pulse signals applied to the scanning signal lines of the digitizer 320 generate an electromagnetic field. When the pen 610 approaches the scanning signal lines, the electromagnetic field is received by the resonance circuit unit 611 of the pen 610, and then is discharged to the digitizer 320 after a predetermined time lapses. In such an embodiment, a circuit in the resonance circuit unit 611 has a structure in which the received electromagnetic field is held for a predetermined time and then is resonated and discharged. The holding time may be controlled by controlling an LC value of the circuit. In an exemplary embodiment of the invention, the electromagnetic field resonated by the resonance circuit unit 611 may be discharged in the blank period EMR.

In such an embodiment, after the scanning signals, which are the square wave pulse signals, are applied to the first scanning signal lines of the digitizer 320 and when the blank period EMR starts, the sensing signals are output to the sensing signal lines. When the touch by the pen 610 occurs on the digitizer 320, the sensing signal may be sensed by the resonated electromagnetic field.

When the blank period EMR ends, the scanning signals are applied to the second scanning signal lines of the digitizer 320, and then when the blank period EMR starts, the sensing signals are output to the sensing signal lines. The same scanning signal is applied to the first to final scanning signal lines of the digitizer 320 as described above, such that the touch of the pen 610 on the digitizer 320 is sensed.

In an exemplary embodiment of the touch sensing display device according to the invention, the two sensing unit parts 510 and 520 are included, but the sensing of the finger 600 is performed in the scanning signal application period Cap., and the sensing of the pen 610 is performed in the blank period EMR. In an alternative exemplary embodiment of the invention, the sensing signals applied to the two sensing unit parts 510 and 520 may partially overlap each other, such that the sensing signal of the digitizer 320 may be partially positioned in the blank period EMR and may be partially positioned in the scanning signal application period Cap.

Hereinafter, an exemplary embodiment of the invention in which the capacitive touch panel 310 and the digitizer 320 are disposed in an integrated sensing panel 330 will be described with reference to FIGS. 6 to 9.

First, an exemplary embodiment of the touch sensing display device according to the invention will be described with reference to FIG. 6.

Figure 6:
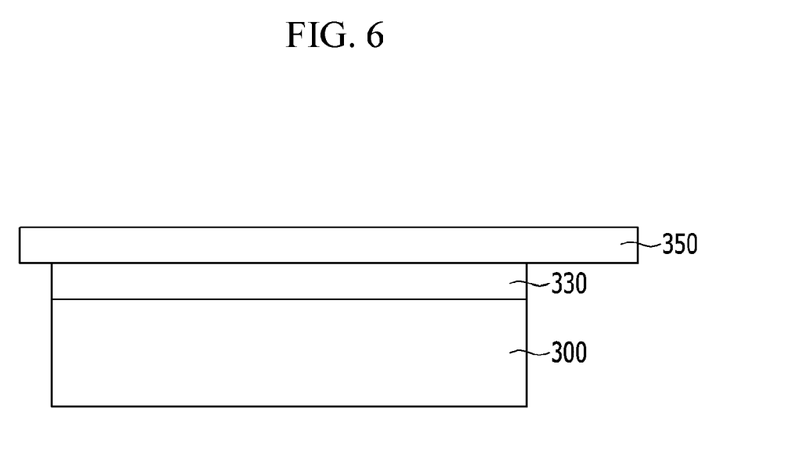
FIG. 6 is a cross-sectional view of an alternative exemplary embodiment of a touch sensing display device, according to the invention.

FIG. 6 is a cross-sectional view of an alternative exemplary embodiment of a touch sensing display device, according to the invention.

An exemplary embodiment of the touch sensing display device includes the integrated sensing panel 330 for sensing a touch of a finger and a touch of a pen on the front surface of the display panel 300. The touch sensing display device is may further include the window 350 on the front surface of the integrated sensing panel 330 to protect the integrated sensing panel 330.

In such an embodiment, the display panel 300 may be one of various types of display panel, e.g., a liquid crystal panel, an organic light emitting display panel, an electrophoretic display panel and an electrowetting display panel.

In an exemplary embodiment, where the display panel 300 is a non-emissive display panel, such as the liquid crystal panel, the display panel 300 may further include a backlight unit.

In an exemplary embodiment, the display panel 300 includes a gate line to which a gate voltage is applied, a data line to which a data voltage is applied, and a pixel which is connected to the gate line and the data line. In such an embodiment, the display panel 300 may include a gate driving unit which applies the gate voltage to the gate line, a data driving unit which applies the data voltage to the data line, and a signal control unit which controls the gate driving unit and the data driving unit.

An image signal is transferred to the signal control unit, and the signal control unit controls the data driving unit and the gate driving unit to allow the display panel 300 to display the image corresponding to the image signal.

The pixel of the display panel 300 may have a predetermined structure, which may be variously modified.

In an exemplary embodiment, as shown in FIG. 6, the touch sensing display device includes the integrated sensing panel 300 which functions as the capacitive touch panel and the digitizer.

The integrated sensing panel 330 is a sensing panel which may sense a touch of a pen based on the electromagnetic resonance, and senses a touch of the finger based on the change in capacitance.

The structure of the integrated sensing panel 330 may be variously modified. One exemplary embodiment of the integrated sensing panel 330 will be described with reference to FIGS. 7 and 8.

First, the circuit structure of an exemplary embodiment of the integrated sensing panel 330 will be described with reference to FIG. 7.

Figure 7:
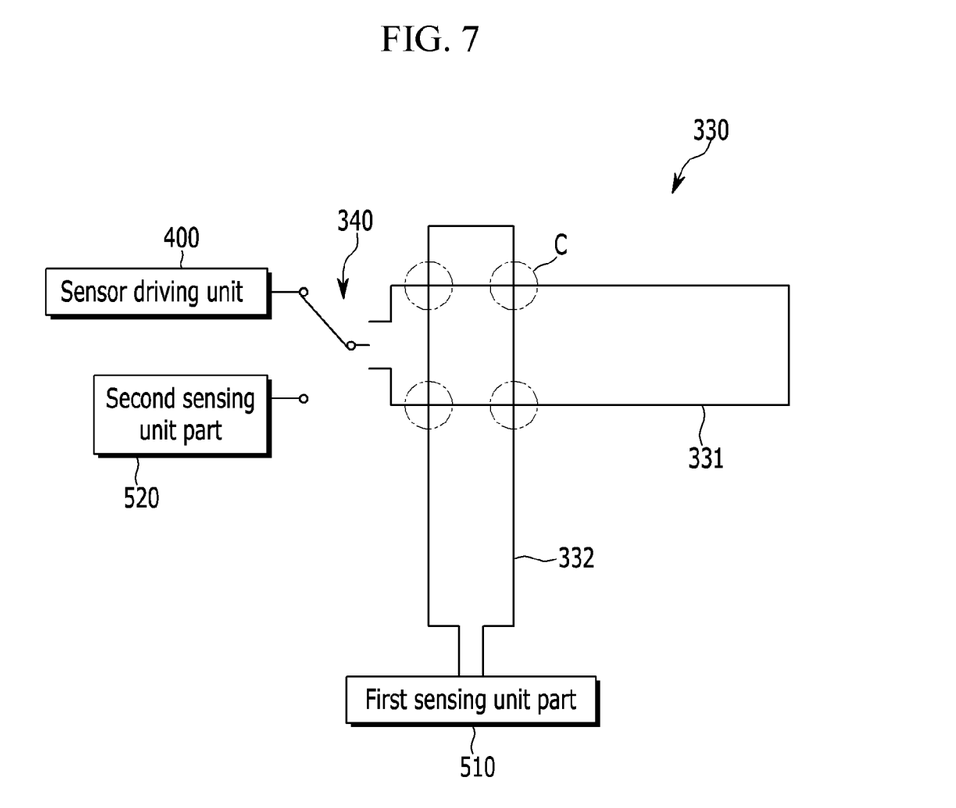
FIG. 7 is a block diagram showing an exemplary embodiment of an integrated sensing panel in the touch sensing display device, according to the invention.

FIG. 7 is a schematic circuit diagram of an exemplary embodiment of the integrated sensing panel in the touch sensing display device, according to the invention.

The integrated sensing panel 330 includes scanning signal lines 331 and sensing signal lines 332. The scanning signal lines 331 extend substantially in a horizontal direction and have a quadrangular loop structure, a side (e.g., a left side) of which is opened. In one exemplary embodiment, for example, the open side or a left side of the scanning signal lines 331 include two ends. In such an embodiment, one of the two ends of the scanning signal lines 331 is applied with the scanning signal or may sense the sensing signal.

The scanning signal lines 332 extend substantially in a vertical direction and have a quadrangular loop structure, a side (e.g., a bottom side) of which is opened. In one exemplary embodiment, for example, the open side or the bottom of the sensing signal lines 332 includes two ends, and at least one of the two ends may sense a monitoring signal.

The integrated sensing panel 330 may include a sensor driving unit 400 and two sensing units, e.g., first and second sensing unit parts 510 and 520. The sensor driving unit 400 is connected to at least one end at the open side of the scanning signal lines 331 to apply the scanning signal. The first sensing unit part 510 may be connected to the two ends at the open side of the lower portion of the sensing signal lines 332, and the second sensing unit part 520 may be connected to at least one end at the open side of the left ends of the scanning signal lines 331.

In such an embodiment, as described above, the scanning signal line 331 may be connected to the sensor driving unit 400 and the second sensing unit part 520, as illustrated in FIG. 7, and integrated sensing panel 330 may further include a switch 340 that controls a connection between the scanning signal line 331 and the sensor driving unit 400 and a connection between the scanning signal line 331 and the second sensing unit part 520.

In FIG. 7, only a portion of the plurality of sensing signal lines 332 and the plurality of scanning signal lines 331 are shown for convenience of illustration, and the sensing signal lines 332 and the scanning signal lines 331, which cross each other, are insulated from each other.

The region C in which the sensing signal line 332 overlaps the scanning signal line 331 defines a capacitor having a capacitance, such that the change in the capacitance due to a touch of the finger thereon may be sensed. In such an embodiment, the electromagnetic resonance due to the touch of the pen may be sensed based on the electromagnetic field, which is generated by the square wave pulse scanning signal applied to the scanning signal line 331. The change in capacitance due to the touch of the finger is sensed by the first sensing unit part 510, and the electromagnetic resonance due to the touch of the pen is sensed by the second sensing unit part 520.

The sensor driving unit 400 sequentially applies the scanning signals to the scanning signal lines 331 of the integrated sensing panel 330. As described above, when the scanning signal is applied to the integrated sensing panel 330, the integrated sensing panel 330 outputs a signal that indicates whether the capacitance is changed due to the touch of the finger 600 to the sensing signal line 322, which is in turn transferred to the first sensing unit part 510, during the scanning signal application period, and transfers a signal that indicates whether the electromagnetic field is changed due to the touch of the pen 610 to the second sensing unit part 520 through the scanning signal line 331 during the blank period. The switch 340, which is disposed at the end of the scanning signal line 331, allows the scanning signal line 331 to be connected to the sensor driving unit 400 during the scanning signal application period, and allows the scanning signal line 331 to be connected to the second sensing unit part 520 during the blank period.

In an alternative exemplary embodiment, the first and second sensing unit parts 510 and 520 may be integrally define the single sensing unit 500. In such an embodiment, the first sensing unit part 510 may sense the change in electromagnetic field due to the touch of the pen, and the first sensing unit 510 may sense the touch of the finger during the scanning signal application period and sense the touch of the pen during the blank period.

Hereinafter, the structure of an exemplary embodiment of the integrated sensing panel 330, according to the invention, will be described in detail with reference to FIG. 8.

Figure 8:
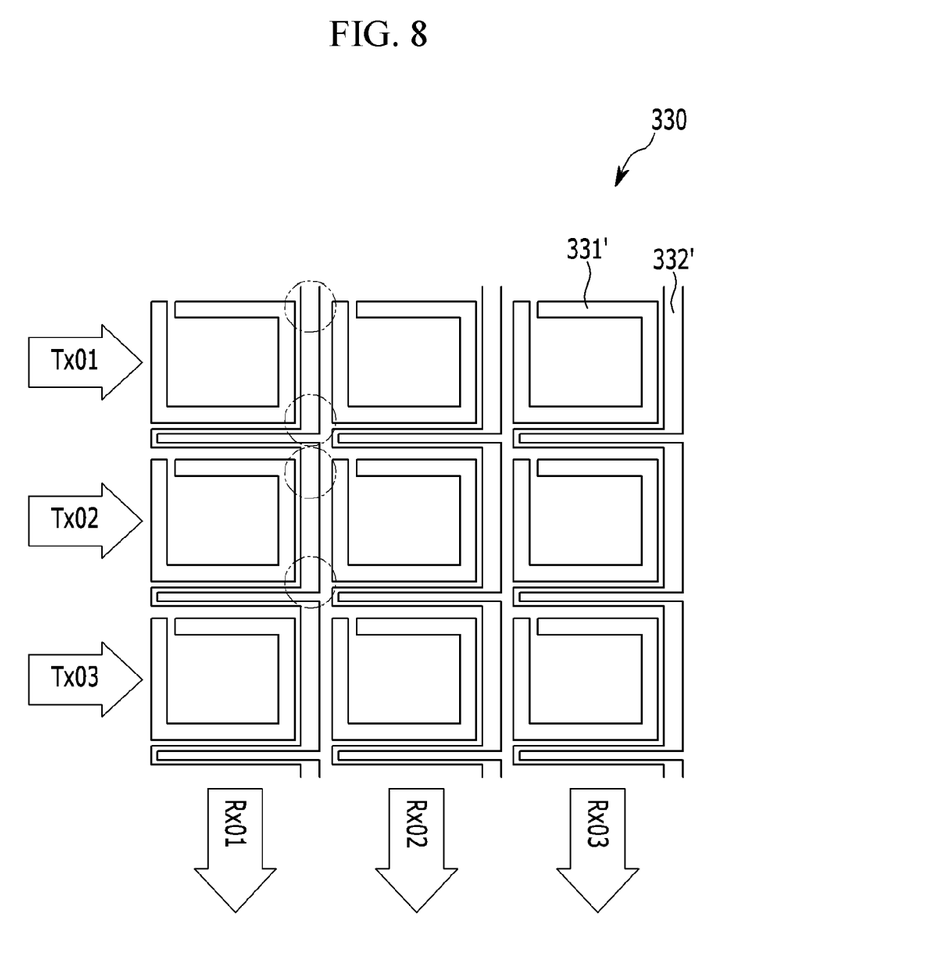
FIG. 8 is a plan view of an exemplary embodiment of the integrated sensing panel in the touch sensing display device, according to the invention.

FIG. 8 is a plan view of an exemplary embodiment of the integrated sensing panel in the touch sensing display device, according to the invention.

An exemplary embodiment of the integrated sensing panel 330 includes a plurality of sensing units which are arranged substantially in a matrix form.

Each of the single sensing units has a quadrangular structure, and includes a scanning signal electrode 331', a corner of which has an opened structure, and a sensing signal electrode 332' which are disposed at a left side and a lower side of the scanning signal electrode 331' and having a bent structure. The sensing signal electrode 332' has a linear structure at the left side of the scanning signal electrode 331' and has a "⊏"-like shape at the lower side of the scanning signal electrode 331'. Horizontally adjacent scanning signal electrodes 331' are connected to each other to configure the scanning signal lines 331 that extend substantially in the horizontal direction. In one exemplary embodiment, for example, the scanning signal electrodes 331' are connected to each other by a connection part disposed below a portion of the sensing signal electrodes 332', e.g., a portion illustrated by a dotted circle in FIG. 8. Vertically adjacent sensing signal electrodes 332' are connected to each other to configure the sensing signal line 332 that extends substantially in the vertical direction.

In such an embodiment, the capacitance is generated at the connection part which connects the horizontally adjacent scanning signal electrodes 331' and the portion (the portion illustrated by the dotted circle in FIG. 8) of the sensing signal electrodes 332', which overlaps the sensing signal electrodes 332', and the touch of the finger is sensed by the change in capacitance at the portion.

In such an embodiment, the change in electromagnetic field due to the scanning signal is sensed based on the structure, in which the scanning signal electrodes 331' connected to each other laterally through the connection part, and the structure in which the sensing signal electrode 332' are connected to each other vertically.

Hereinafter, an operation of the integrated sensing panel 330 will be described with reference to FIG. 9.

Figure 9:
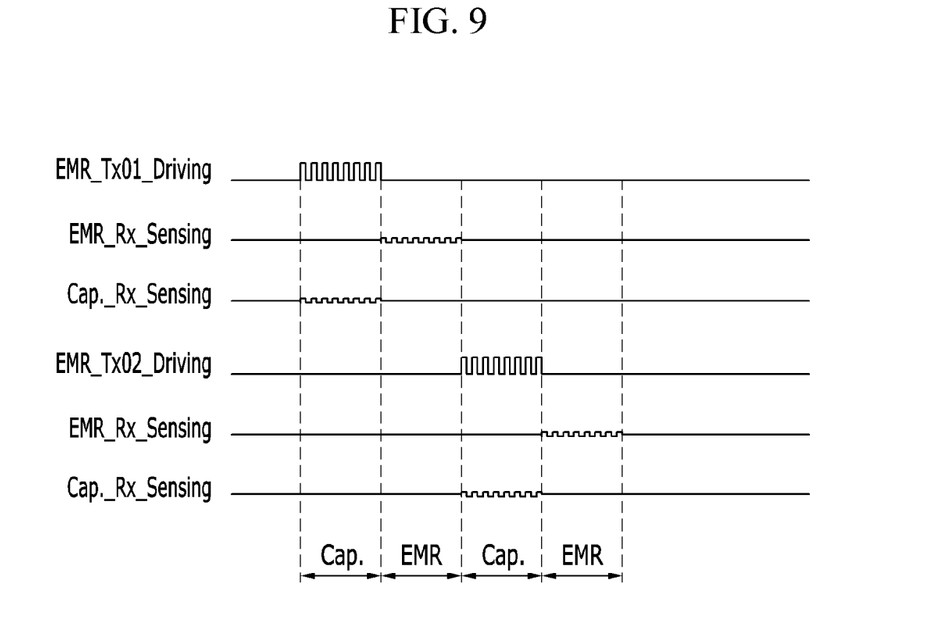
FIG. 9 is a waveform diagram illustrating scanning and sensing signals of an exemplary embodiment of the integrated sensing panel of the touch sensing display device, according to the invention.

FIG. 9 is a waveform diagram illustrating scanning and sensing signals of an exemplary embodiment of the integrated sensing panel of the touch sensing display device, according to the invention.

In FIG. 9, 'Tx' represents the scanning signal output from the sensor driving unit 400, and the numbers attached behind 'Tx', e.g., 01 and 02, are channel numbers. The channel number may correspond to one scanning signal line or a plurality of scanning signal lines. Hereinafter, an exemplary embodiment of the invention, in which one scanning signal line corresponds to one channel, will be described. In FIG. 9, 'Rx' represents the sensing signal which is received by the sensing unit 500, 'EMR_Rx' represents the sensing signal of the pen, that is, the sensing signal of the second sensing unit part 520, and 'Cap._Rx' represents the sensing signal of the finger, that is, the sensing signal of the first sensing unit part 510.

As illustrated in FIG. 9, the sensor driving unit 400 sequentially applies the square wave pulse signals to the scanning signal lines of the integrated sensing panel 330 for each predetermined time. In such an embodiment, a blank period of a predetermined time is provided between the square wave pulse signals applied to the adjacent scanning signal lines of the integrated sensing panel 330.

In such an embodiment, after the scanning signal, which is the square wave pulse signal, is applied to the first scanning signal line of the integrated sensing panel 330, when the application of the scanning signal to the first scanning signal line ends, the blank period of the predetermined time starts, and then the scanning signal is applied to the second scanning signal line of the integrated sensing panel 330. As described above, the scanning signal is sequentially applied to the first to final scanning signal lines of the integrated sensing panel 330, with the blank period therebetween.

The application period of the scanning signal is referred to as Cap. in FIG. 9, and the blank period is referred to as EMR in FIG. 9.

As described above, the integrated sensing panel 330 applied with the scanning signals outputs the sensing signals, and as illustrated in FIG. 9, the sensing signal of the finger and the sensing signal of the pen are separated from each other, without temporally overlapping each other.

Hereinafter, the sensing of the finger and the sensing of the pen will be described in greater detail.

When the scanning signals, which are the square wave pulse signal of the sensor driving unit 400, are sequentially applied to the scanning signal lines of the integrated sensing panel 330, the sensing signals corresponding to the sensing of the touch of the finger are output from the sensing signal lines at the same timing. In such an embodiment, the sensing signal is transferred through the portion, at which the scanning signal lines and the sensing signal lines are capacitively coupled with each other, such that a size of the square wave pulse of the sensing signal is smaller than a size of the square wave pulse of the scanning signal. During the blank period after the scanning signal application period, the sensing signal due to the touch of the pen is output to the sensing signal line. The electromagnetic field generated by the scanning signal of the scanning signal line is transferred to the resonance circuit unit 611 of the pen 610, and is then discharged to the integrated sensing panel 330 due to the resonance after a predetermined time lapses. In such an embodiment, the circuit in the resonance circuit unit 611 has a structure in which the received electromagnetic field is held for a predetermined time and then is resonated and discharged. The holding time may be controlled by controlling an LC value of the circuit. In an exemplary embodiment of the invention, the electromagnetic field resonated by the resonance circuit unit 611 is discharged during the blank period.

In such an embodiment, when the scanning signal, which is the square wave pulse signal, is applied to the first scanning signal line of the integrated sensing panel 330, the sensing signals are output to the plurality of sensing signal lines at the same timing. When the touch of the finger 600 does not occur the square wave pulse illustrated in FIG. 9 having a small size is generated, and when the touch of the finger 600 occurs, the square wave pulse having the small size may be deformed.

Next, when the application of the scanning signal to the first scanning signal line ends, the blank period of a predetermined time begins. The sensing signal corresponding to the sensing of the touch of the pen is output to the sensing signal line during the blank period. When the touch of the pen 610 occurs, the sensing signal may be sensed by the resonated electromagnetic field.

When the scanning signal is applied to the second scanning signal line of the integrated sensing panel 330, the sensing signals are output to the plurality of sensing signal lines at the same timing. Next, when the application of the scanning signal to the second scanning signal line ends, the sensing signal by the pen is output to the sensing signal line during the blank period of a predetermined time thereafter.

In an exemplary embodiment, the same scanning signal is applied to the first to final scanning signal line of the integrated sensing panel 330 as described above, such that the touches of the finger 600 and the pen 610 are sensed.

According to an exemplary embodiment, as shown in FIG. 7, the integrated sensing panel 330 may include two sensing unit parts 510 and 520. In an alternative exemplary embodiment, the integrated sensing panel 330 may include only one sensing unit. As described above, in an exemplary embodiment, where the integrated sensing panel 330 includes a single sensing unit 500, the sensing of the finger 600 is performed for the scanning signal application period and the sensing of the pen 610 is performed during the blank period, such that the sensing of the finger 600 and the sensing of the pen 610 may effectively performed during different time periods from each other using only one sensing unit 500. Accordingly, in such an embodiment, manufacturing cost of the touch sensing display device may be reduced, and the thickness of the touch sensing display device may be reduced.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch sensing display device comprising:
   a display panel;
   a capacitive touch panel disposed on a front surface of the display panel;
   a digitizer disposed on a surface of the display panel;
   a sensor driving unit which applies same scanning signals simultaneously to the capacitive touch panel and the digitizer; and
   a sensing unit which senses a sensing signal of the capacitive touch panel and a sensing signal of the digitizer,
   wherein the sensing unit receives the sensing signal of the capacitive touch panel and the sensing signal of the digitizer at different times,
   wherein each of the scanning signals is applied during a scanning signal application period, and a blank period is between two consecutive scanning signal application periods,
   wherein the sensing signal of the capacitive touch panel is transferred to the sensing unit during the scanning signal application period, and
   wherein the sensing signal of the digitizer is transferred to the sensing unit during the blank period.

2. The touch sensing display device of claim 1, wherein the touch sensing display device comprises only one sensing unit.

3. The touch sensing display device of claim 1, further comprising:
   a scanning signal line which extends substantially in a predetermined direction and transmits the scanning signals; and
   a sensing signal line which extends substantially in a direction substantially vertical to the scanning signal line and transmits the sensing signal of the capacitive touch panel or the sensing signal of the digitizer.

4. The touch sensing display device of claim 1, wherein the sensing unit comprises a first sensing unit part and a second sensing unit part,
   the sensing signal of the capacitive touch panel is transferred to the first sensing unit part, and
   the sensing signal of the digitizer is transferred to the second sensing unit part.

5. The touch sensing display device of claim 4, further comprising:
   a scanning signal line which extends substantially in a predetermined direction and transmits the scanning signals;
   a sensing signal line which extends substantially in a direction substantially vertical to the scanning signal line,
   wherein
   the first sensing unit is connected to the sensing signal line, and
   the second sensing unit is connected to the scanning signal line.

6. The touch sensing display device of claim 5, further comprising:
   a switch unit which controls a connection between the second sensing unit and the scanning signal line and a connection between the sensor driving unit and the scanning signal line.

7. The touch sensing display device of claim 1, further comprising:
   a pen which electromagnetically resonates with the scanning signals to enable the digitizer to sense a position of the pen.

8. The touch sensing display device of claim 7, wherein the pen comprises a resonance circuit unit and controls the resonance circuit unit to allow the sensing signal of the digitizer to be generated during the blank period.

9. The touch sensing display device of claim 1, further comprising:
   a window which is disposed on a front surface of the capacitive touch panel.

10. The touch sensing display device of claim 1, further comprising:
    an integrated sensing panel in which the capacitive touch panel and the digitizer are integrally disposed.

11. The touch sensing display device of claim 10, wherein the integrated sensing panel comprises:
    a scanning signal line which is disposed substantially in a horizontal direction and has quadrangular loop structures, a side of which is opened; and
    a sensing signal line which extends substantially in a vertical direction and comprises sensing signal electrodes having bent structures, wherein each bent structure is disposed at a left side and a lower side of a corresponding quadrangular loop structure of the quadrangular loop structures.

12. The touch sensing display device of claim 11, wherein the quadrangular loop structures of the scanning signal line are arranged substantially in the horizontal direction and electrically connected to each other, and
    the bent structures of the sensing signal electrodes are arranged substantially in the vertical direction and electrically connected to each other.

13. The touch sensing display device of claim 12, wherein a capacitive touch is sensed at a portion at which the scanning signal line and the sensing signal line overlap each other.

14. The touch sensing display device of claim 13, wherein each of the scanning signals is applied during a scanning signal application period, and
    a blank period is between two consecutive scanning signal application periods.

* * * * *